US011646130B2

(12) United States Patent
Yamanouchi et al.

(10) Patent No.: US 11,646,130 B2
(45) Date of Patent: May 9, 2023

(54) WIRE HARNESS CAPABLE OF SUPPRESSING A DECREASE IN INSULATION RELIABILITY

(71) Applicant: SUMITOMO WIRING SYSTEMS, LTD., Yokkaichi (JP)

(72) Inventors: Hiroki Yamanouchi, Yokkaichi (JP); Takuji Iwama, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/586,210

(22) Filed: Jan. 27, 2022

(65) Prior Publication Data

US 2022/0262542 A1    Aug. 18, 2022

(30) Foreign Application Priority Data

Feb. 12, 2021   (JP) .............................. JP2021-021256

(51) Int. Cl.
*H01B 7/00*     (2006.01)
*B60R 16/02*    (2006.01)

(52) U.S. Cl.
CPC ....... *H01B 7/0045* (2013.01); *B60R 16/0215* (2013.01)

(58) Field of Classification Search
CPC .......................... H01B 7/0045; B60R 16/0215
USPC ........................................................ 174/72 A
See application file for complete search history.

(56) References Cited

U.S. PATENT DOCUMENTS

2015/0334882 A1* 11/2015 Sugino ................. H02G 3/0481
                                                          29/428
2019/0023199 A1*  1/2019 Nakai ...................... H01B 7/04

FOREIGN PATENT DOCUMENTS

JP          2017-062995 A      3/2017

* cited by examiner

*Primary Examiner* — Timothy J Thompson
*Assistant Examiner* — Michael F McAllister
(74) *Attorney, Agent, or Firm* — Oliff PLC

(57) ABSTRACT

A wire harness including a plurality of first electric wire members that each have a first flexible electric wire and a hard electric wire electrically connected to the first flexible electric wire: a second electric wire member that is a second flexible electric wire: a tube through which the plurality of first electric wire members and the second electric wire member pass: and a fixing member for bundling the plurality of first electric wire members and the second electric wire member, wherein: the tube includes a bend, and the wire harness is configured to achieve a first arrangement.

8 Claims, 6 Drawing Sheets

WIRE HARNESS CAPABLE OF SUPPRESSING A DECREASE IN INSULATION RELIABILITY

This application claims priority from Japanese Patent Application No. 2021-021256 filed Feb. 12, 2021, the entire disclosure of which is incorporated herein by reference.

BACKGROUND

The present disclosure relates to a wire harness.

Conventionally, wire harnesses to be used in vehicles such as hybrid cars and electric cars include electric wires for electrically connecting electric apparatuses such as a high-voltage battery and an inverter (see JP 2017-62995A, for example). In this type of wire harness, a plurality of electric wires are collectively surrounded by a metal pipe made of a metal for the purpose of protecting the electric wires and taking measures against noise.

SUMMARY

In the case of a conventional wire harness, the metal pipe is bent in a state in which a plurality of electric wires are inserted into the metal pipe. As shown in FIG. 8, a plurality of electric wires 110 and 120 inserted into a metal pipe 100 are simultaneously bent during this bending process. As a result, the electric wires 110 and 120 come into contact with the inner circumferential surface of the metal pipe 100 at an inner bent part 102 of a bent portion 101 of the metal pipe 100. At this time, as shown in FIG. 9, the electric wires 110 and the electric wires 120 may overlap each other at the inner bent part 102. In this case, the electric wires 120 may be compressed between the inner surface of the inner bent part 102 of the metal pipe 100 and the outer circumferential surfaces of the electric wires 110. This compression may cause a problem in that the thicknesses of insulating coatings 121 of the electric wires 120 are reduced, thus resulting in a decrease in the insulation reliability of the electric wires 120.

An exemplary aspect of the disclosure provides a wire harness capable of suppressing a decrease in insulation reliability.

A wire harness of the present disclosure includes: a plurality of first electric wire members that each have a first flexible electric wire and a hard electric wire electrically connected to the first flexible electric wire: a second electric wire member that is a second flexible electric wire: a tube through which the plurality of first electric wire members and the second electric wire member pass: and a fixing member for bundling the plurality of first electric wire members and the second electric wire member, wherein the tube includes a bend, the wire harness is configured to achieve a first arrangement, an arrangement of the plurality of first electric wire members and the second electric wire member inside the bend is the first arrangement in which the plurality of first electric wire members are lined up in a first direction and the second electric wire member is lined up with the plurality of first electric wire members in a second direction that intersects the first direction, the plurality of first electric wire members are each in contact with an inner circumferential surface of the bend inside the bend and the second electric wire member is provided in a space surrounded by outer circumferential surfaces of the plurality of first electric wire members and the inner circumferential surface of the bend inside the bend, and the second electric wire member is spaced apart from the outer circumferential surfaces of the plurality of first electric wire members and/or the inner circumferential surface of the bend.

The wire harness of the present disclosure exhibits an effect of suppressing a decrease in insulation reliability.

DETAILED DESCRIPTION OF EMBODIMENTS

Figure 1:
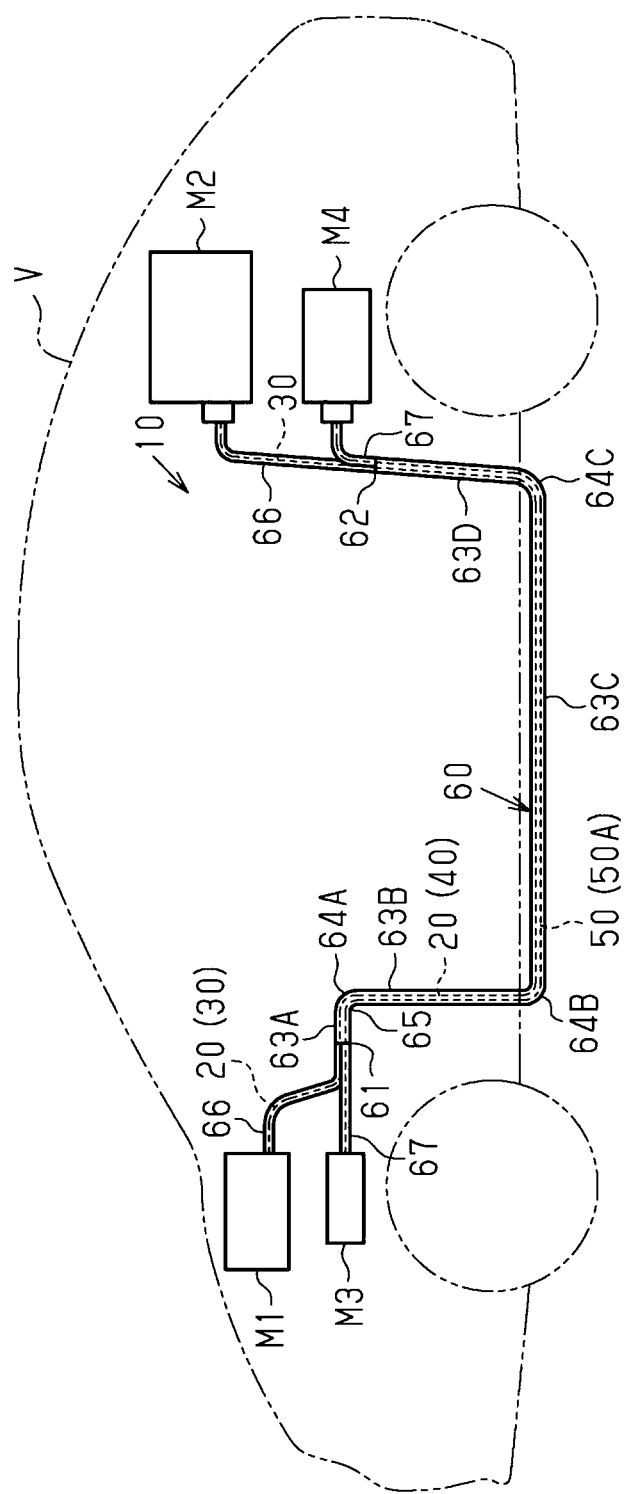
FIG. 1 is a schematic configuration diagram illustrating a wire harness of an embodiment.

Description of Embodiments of the Present Disclosure

First, embodiments of the present disclosure will be listed and described.

(1) A wire harness of the present disclosure includes: a plurality of first electric wire members that each have a first flexible electric wire and a hard electric wire electrically connected to the first flexible electric wire: a second electric wire member that is a second flexible electric wire: a tubular member through which the plurality of first electric wire members and the second electric wire member pass: and a fixing member for bundling the plurality of first electric wire members and the second electric wire member, wherein the tubular member includes a bent portion, an arrangement of the first electric wire members and the second electric wire member inside the bent portion is a first arrangement in which the plurality of first electric wire members are lined up in a first direction and the second electric wire member is lined up with the first electric wire members in a second direction that intersects the first direction, the plurality of first electric wire members are each in contact with an inner circumferential surface of the bent portion, inside the bent portion, and the second electric wire member is provided in a space surrounded by outer circumferential surfaces of the plurality of first electric wire members and the inner circumferential surface of the bent portion, inside the bent portion, and the second electric wire member is spaced apart from the outer circumferential surfaces of the first electric wire members and/or the inner circumferential surface of the bent portion.

With this configuration, the second electric wire member is provided in the space surrounded by the outer circumferential surfaces of the plurality of first electric wire members and the inner circumferential surface of the bent portion, inside the bent portion, and the second electric wire member is spaced apart from the outer circumferential surfaces of the first electric wire members and/or the inner circumferential surface of the bent portion. Accordingly, it is possible to keep the second electric wire member from being compressed by the outer circumferential surfaces of the first electric wire members and the inner circumferential surface of the bent portion. Thus, it is possible to suppress damage to the insulating coatings of the first electric wire members and the insulating coating of the second electric wire member in the bent portion. As a result, it is possible to suppress a decrease in the insulation reliability of the first electric wire members and the second electric wire member.

Here, the term "tubular" as used herein encompasses not only such a shape that is formed by a circumferential wall continuously formed over the entire circumference in the circumferential direction, but also a tubular shape formed by an assembly of a plurality of components, and a shape such as a C-shape in which a portion in the circumferential direction is cut out. Moreover, the external edge of the "tubular shape" may have a circular shape, an elliptical shape, or a polygonal shape with sharp corners or rounded corners.

(2) It is preferable that the wire harness includes a plurality of the fixing members, the plurality of fixing members each keep the arrangement of the first electric wire members and the second electric wire member as the first arrangement, and the plurality of fixing members are provided at intervals in a longitudinal direction of the tubular member. With this configuration, it is possible to favorably keep the arrangement of the first electric wire members and the second electric wire member inside the tubular member as the first arrangement using the plurality of fixing members that are provided at intervals in the longitudinal direction of the tubular member.

(3) It is preferable that the plurality of fixing members are provided on both sides of the bent portion in the longitudinal direction of the tubular member. With this configuration, it is possible to keep the arrangement of the first electric wire members and the second electric wire member on both sides of the bent portion as the first arrangement using the plurality of fixing members provided on both sides of the bent portion. Thus, it is possible to favorably keep the arrangement of the first electric wire members and the second electric wire member in the bent portion provided between the plurality of fixing members as the first arrangement.

(4) It is preferable that a lateral cross-sectional shape of the first electric wire members is a perfect circle, a lateral cross-sectional shape of the second electric wire member is a perfect circle, a lateral cross-sectional shape of the tubular member is a perfect circle, and in the first arrangement, two of the first electric wire members are in external contact with each other, and the second electric wire member is provided in a gap formed between outer circumferences of the two first electric wire members. With this configuration, the second electric wire member is provided in the gap formed between the outer circumferences of the two first electric wire members that are in external contact with each other. Thus, it is possible to favorably bring the second electric wire member into contact with the outer circumferential surfaces of the two first electric wire members. Accordingly, it is possible to increase the contact area between the first electric wire members and the second electric wire member compared with a configuration in which the second electric wire member comes into contact with only one first electric wire member. Therefore, it is possible to, for example, favorably disperse stress applied to the second electric wire member due to vibrations or the like, thus making it possible to favorably suppress damage to the insulating coating of the second electric wire member. Here, the term "perfect circle" as used herein encompasses a precisely perfect circle as well as a circle that is acceptable as a substantially perfect circle.

(5) It is preferable that, when a radius of an outer circumference of the second electric wire member is defined as a, a radius of the outer circumference of each of the two first electric wire members is defined as b, and a radius of an inner circumference of the tubular member is defined as c, a radius of an outer circumference of the second electric wire member is set to a value smaller than the radius a that satisfies Formula 1 below:

[Mathematical Formula 1]

$$\left(\frac{1}{a} + \frac{2}{b} - \frac{1}{c}\right)^2 = 2\left(\frac{1}{a^2} + \frac{2}{b^2} + \frac{1}{c^2}\right) \quad \text{(Formula 1)}$$

When two first electric wire members and one second electric wire member are in external contact with one another, and all of the two first electric wire members and the second electric wire member are in internal contact with the inner circumferential surface of the tubular member, Formula 1 above is satisfied. Accordingly, when Formula 1 above is satisfied, the second electric wire member is in contact with the outer circumferential surfaces of the two first electric wire members and is in contact with the inner circumferential surface of the tubular member. In contrast, with the above-mentioned configuration, the radius of the outer circumference of the second electric wire member is set to a value smaller than the radius a that satisfies Formula 1 above. This enables the second electric wire member to be favorably spaced apart from the outer circumferential surfaces of the two first electric wire members and/or the inner circumferential surface of the bent portion. Therefore, it is possible to more favorably keep the second electric wire member from being compressed by the outer circumferential surfaces of the first electric wire members and the inner circumferential surface of the bent portion.

(6) It is preferable that an outer diameter of the second electric wire member is smaller than outer diameters of the first electric wire members. With this configuration, it is possible to keep the second electric wire member from being compressed by the outer circumferential surfaces of the first electric wire members and the inner circumferential surface of the bent portion even if the outer diameter of the second electric wire member is smaller than the outer diameters of the first electric wire members.

(7) It is preferable that the wire harness includes two second electric wire members, and in the first arrangement, the two second electric wire members are respectively provided in two gaps formed between outer circumferences of the two first electric wire members. With this configuration, the two second electric wire members are respectively provided in the two gaps formed between the two first electric wire members. Accordingly, it is possible to favorably keep the two second electric wire members from being arranged between the outer circumferential surfaces of the two first electric wire members and the inner circumferential surface of the bent portion, inside the bent portion. Thus, it is possible to favorably keep the second electric wire members from being compressed by the outer circumferential surfaces of the first electric wire members and the inner circumferential surface of the bent portion.

(8) It is preferable that the hard electric wires in a longitudinal direction of the first electric wire members are provided in the bent portion. With this configuration, it is possible to keep the second electric wire member from being compressed by the outer circumferential surfaces of the plurality of hard electric wires and the inner circumferential surface of the bent portion, inside the bent portion. As a result, it is possible to suppress damage to the insulating coatings of the hard electric wires and the insulating coating of the second electric wire member.

Details of Embodiments of the Present Disclosure

The following describes specific embodiments of a wire harness of the present disclosure with reference to the drawings. A portion of the configuration may be exaggerated or simplified for illustrative purposes in the diagrams. In addition, the ratios between the dimensions of portions shown in the diagrams may be different from each other. The terms "parallel" and "orthogonal" as used herein encompass not only "precisely parallel" and "precisely orthogonal" but also "substantially parallel" and "substantially orthogonal", as long as the functions and effects of these embodiments are exhibited. Note that the present disclosure is not limited to these embodiments and is defined by the scope of the appended claims, and all changes that fall within the same essential spirit as the scope of the claims are intended to be included therein.

Overall Configuration of Wire Harness 10

As shown in FIG. 1, a wire harness 10 electrically connects two or three or more electric apparatuses M1, M2, M3, and M4. The wire harness 10 is installed, for example, in a vehicle V such as a hybrid car or an electric car. The wire harness 10 includes a plurality of (two in this embodiment) electric wire members 20 that electrically connect the electric apparatus M1 and the electric apparatus M2, and one or more (two in this embodiment) electric wire members 50 that electrically connect the electric apparatus M3 and the electric apparatus M4. The wire harness 10 includes, for example, a tubular member 60 (tube) through which the electric wire members 20 and the electric wire members 50 pass, a tubular exterior member 66 that surrounds the portions of the electric wire members 20 extending from the tubular member 60, and a tubular exterior member 67 that surrounds the portions of the electric wire members 50 extending from the tubular member 60. The tubular member 60 includes end portions 61 and 62 in the longitudinal direction of the tubular member 60. The exterior members 66 and 67 are provided corresponding to the end portions 61 and 62 of the tubular member 60, respectively. The tubular member 60 and the exterior members 66 and 67 protect the electric wire members 20 and 50 housed therein from flying objects and waterdrops.

Configuration of Electric Wire Member 20

One end portion of each electric wire member 20 is connected to the electric apparatus M1, and the other end portion of each electric wire member 20 is connected to the electric apparatus M2. An example of the electric apparatus M1 is an inverter that is installed in the front portion of the vehicle V, and an example of the electric apparatus M2 is a high-voltage battery that is installed on the rear side of the vehicle V with respect to the electric apparatus M1. The inverter is connected, for example, to a wheel driving motor that serves as a power source for vehicle travel. The high-voltage battery can supply, for example, a voltage of a hundred volts or more.

Figure 2:
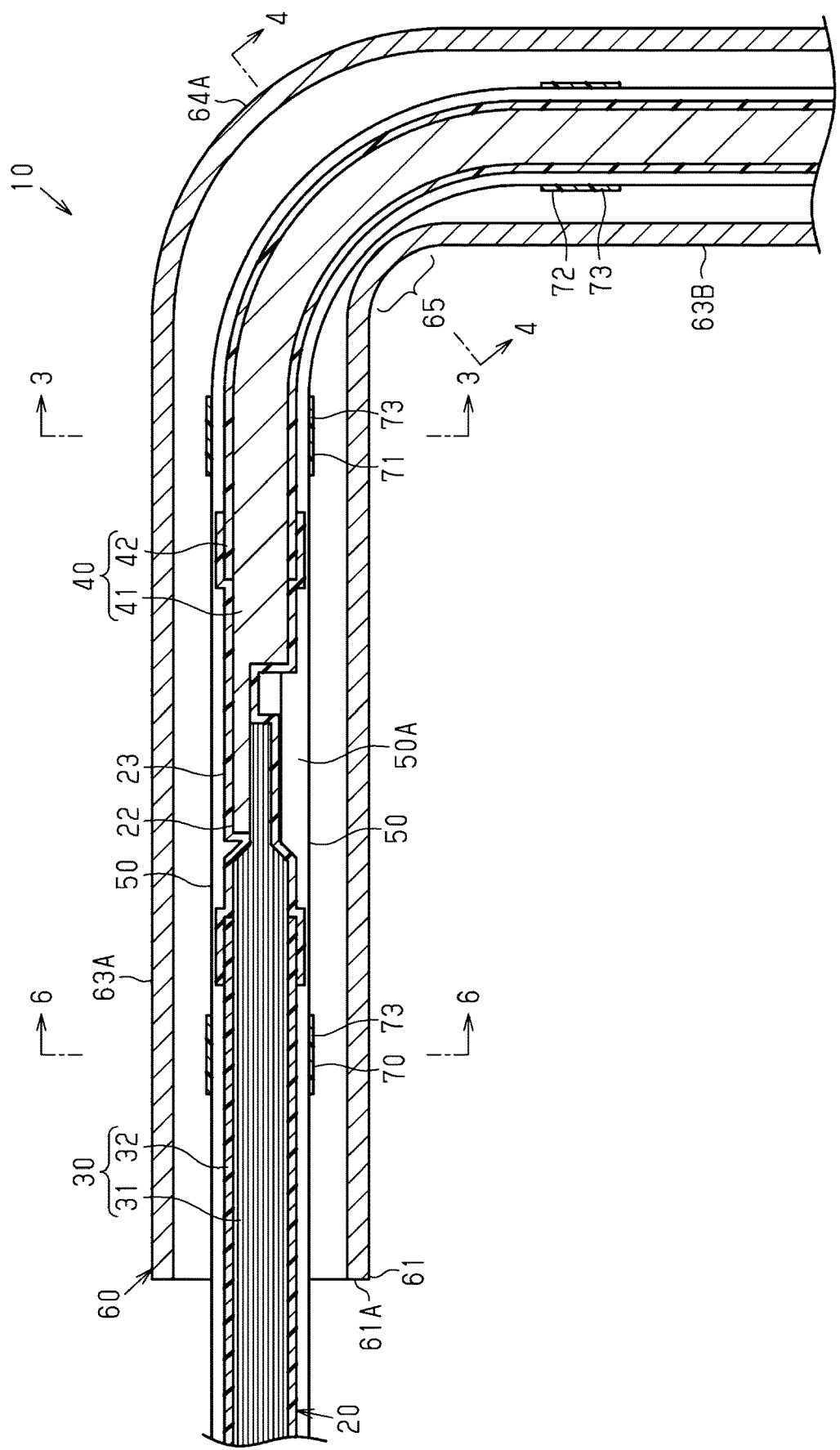
FIG. 2 is a schematic cross-sectional view illustrating the wire harness of the embodiment.

As shown in FIG. 2, each electric wire member 20 includes a flexible electric wire 30, and a hard electric wire 40 that is electrically connected to the flexible electric wire 30. The electric wire member 20 is formed by electrically connecting the flexible electric wire 30 and the hard electric wire 40, which are different types of electric wires, in the longitudinal direction of the electric wire member 20. The electric wire member 20 includes a connection portion 22 where the flexible electric wire 30 and the hard electric wire 40 are joined to each other, and a covering member 23 that covers the outer circumference of the connection portion 22. In the electric wire member 20, the flexible electric wires 30 are connected to both end portions in the longitudinal direction of the hard electric wire 40. The flexible electric wire 30 and the hard electric wire 40 are, for example, high-voltage electric wires to which a high voltage/a large current can be applied. The flexible electric wire 30 and the hard electric wire 40 may each be, for example, a shielded electric wire having an electromagnetic shielding structure, or a non-shielded electric wire having no electromagnetic shielding structure. The flexible electric wire 30 and the hard electric wire 40 of this embodiment are non-shielded electric wires. Note that, although FIG. 2 shows the structures of the electric wire members 20 and 50 at the end portion 61 of the tubular member 60, the structures of the electric wire members 20 and 50 at the end portion 62 of the tubular member 60 (see FIG. 1) are the same as these structures.

Configuration of Flexible Electric Wire 30

The flexible electric wire 30 is, for example, more flexible than the hard electric wire 40. The flexible electric wire 30 has, for example, higher bendability than the hard electric wire 40.

The flexible electric wire 30 includes a core wire 31 constituted by a plurality of metal strands, and an insulating coating 32 that covers the outer circumference of the core wire 31. Examples of the core wire 31 include a stranded wire formed by twisting a plurality of metal strands together, and a braided member formed by braiding a plurality of metal strands into a tubular shape. The core wire 31 of this embodiment is a stranded wire. Examples of the material of the core wire 31 include metal materials such as copper-based materials and aluminum-based materials.

The insulating coating 32 covers, for example, the outer circumferential surface of the core wire 31 over the entire circumference in the circumferential direction thereof. The insulating coating 32 is made of, for example, an insulating material such as a synthetic resin.

The shape of the cross section of the flexible electric wire 30 taken along a plane orthogonal to the longitudinal direction of the flexible electric wire 30, namely the lateral cross-sectional shape of the flexible electric wire 30, may be a desired shape. The lateral cross-sectional shape of the flexible electric wire 30 may be, for example, a circular shape, a semicircular shape, a polygonal shape, a square shape, or a flat shape. The lateral cross-sectional shape of the flexible electric wire 30 of this embodiment is a perfect circle.

Configuration of Hard Electric Wire 40

The hard electric wire 40 has, for example, higher flexural rigidity than the flexible electric wire 30. The hard electric wire 40 has, for example, such rigidity that enables the hard electric wire 40 to keep a shape extending along the wiring path of the electric wire member 20.

The hard electric wire 40 includes, for example, a single-core wire 41 constituted by a single conductor, and an insulating coating 42 that covers the outer circumference of the single-core wire 41. Examples of the single-core wire 41 include a columnar conductor constituted by a single columnar metal rod having a solid structure, and a tubular conductor having a hollow structure. The single-core wire 41 of this embodiment is a columnar conductor. Examples of the material of the single-core wire 41 include metal materials such as copper-based materials and aluminum-based materials.

The insulating coating 42 covers, for example, the outer circumferential surface of the single-core wire 41 over the entire circumference in the circumferential direction thereof. The insulating coating 42 is made of, for example, an insulating material such as a synthetic resin. For example, a heat-shrinkable tube or a rubber tube can also be used as the insulating coating 42.

The lateral cross-sectional shape of the hard electric wire 40 may be a desired shape. The lateral cross-sectional shape of the hard electric wire 40 of this embodiment is a perfect circle.

Configuration of Connection Portion 22

The core wire 31 and the single-core wire 41 are joined to each other at the connection portion 22. Specifically, the core wire 31 exposed from the insulating coating 32 at an end portion in the longitudinal direction of the flexible electric wire 30 is joined to the single-core wire 41 exposed from the insulating coating 42 at an end portion in the longitudinal direction of the hard electric wire 40. For example, at the connection portion 22, the core wire 31 and the single-core wire 41 are stacked in the radial direction, namely a direction that intersects the longitudinal direction of the core wire 31 and the single-core wire 41, and are joined to each other. Note that there is no particular limitation on the method of connecting the core wire 31 and the single-core wire 41. Examples of the method of connecting the core wire 31 and the single-core wire 41 include supersonic welding and laser welding.

Configuration of Covering Member 23

The covering member 23 is formed, for example, in an elongated tubular shape. The covering member 23 covers the outer circumference of the connection portion 22. For example, the covering member 23 spans the end portion of the insulating coating 32 and the end portion of the insulating coating 42. For example, one end portion of the covering member 23 covers the outer circumferential surface of the end portion of the insulating coating 32, and the other end portion of the covering member 23 covers the outer circumferential surface of the end portion of the insulating coating 42. The covering member 23 surrounds the outer circumference of the flexible electric wire 30 and the outer circumference of the hard electric wire 40 over the entire circumference in the circumferential direction thereof. The covering member 23 has, for example, a function of keeping the connection portion 22 electrically insulated. Examples of the covering member 23 include a shrinkable tube, a rubber tube, a resin mold, a hot melt adhesive, and a tape member. The covering member 23 of this embodiment is a heat-shrinkable tube.

Here, the hard electric wire 40 is provided, for example, inside the tubular member 60. For example, the tubular member 60 surrounds the hard electric wire 40 over the entire length in the longitudinal direction of the hard electric wire 40. The connection portion 22 is provided, for example, inside the tubular member 60. For example, an end portion in the longitudinal direction of the flexible electric wire 30 is provided inside the tubular member 60. The flexible electric wire 30 is provided such that a portion thereof extends toward the outside of the tubular member 60 from the end portion 61 in the longitudinal direction of the tubular member 60.

Configuration of Electric Wire Member 50

As shown in FIG. 1, one end portion of each electric wire member 50 is connected to the electric apparatus M3, and the other end portion of each electric wire member 50 is connected to the electric apparatus M4. An example of the electric apparatus M3 is a relay box that is installed in the front portion of the vehicle V, and an example of the electric apparatus M4 is a low-voltage battery that is installed in the rear portion of the vehicle V. The relay box distributes a voltage supplied from the low-voltage battery to various apparatuses installed in the vehicle V. The low-voltage battery can supply a lower voltage (e.g., 12 volts) than the high-voltage battery does.

Figure 3:
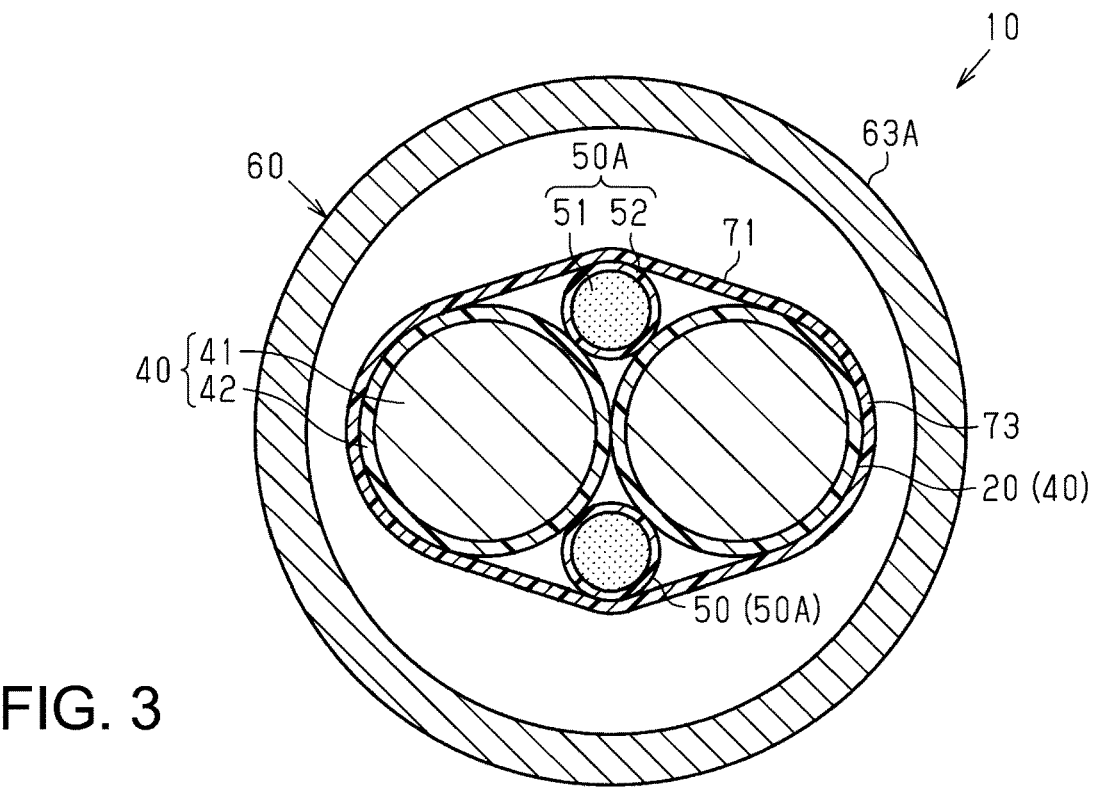
FIG. 3 is a schematic lateral cross-sectional view illustrating the wire harness of the embodiment (a cross-sectional view taken along line 3-3 in FIG. 2).

As shown in FIG. 3, the electric wire members 50 are flexible electric wires 50A. That is, each electric wire member 50 is constituted by only a single flexible electric wire 50A. The flexible electric wire 50A extends over the entire length in the longitudinal direction of the electric wire member 50. The flexible electric wire 50A is, for example, a low-voltage electric wire. The flexible electric wire 50A may be, for example, a shielded electric wire or a non-shielded electric wire. The flexible electric wire 50A of this embodiment is a non-shielded electric wire.

Configuration of Flexible Electric Wire 50A

The flexible electric wire 50A is, for example, more flexible than the hard electric wire 40. The flexible electric wire 50A has, for example, higher bendability than the hard electric wire 40.

The flexible electric wire 50A includes a core wire 51 constituted by a plurality of metal strands, and an insulating coating 52 that covers the outer circumference of the core wire 51. Examples of the core wire 51 include a stranded wire and a braided member. The core wire 51 of this embodiment is a stranded wire. Examples of the material of the core wire 51 include metal materials such as copper-based materials and aluminum-based materials.

The insulating coating 52 covers, for example, the outer circumferential surface of the core wire 51 over the entire circumference in the circumferential direction thereof. The insulating coating 52 is made of, for example, an insulating material such as a synthetic resin.

The lateral cross-sectional shape of the flexible electric wire 50A may be a desired shape. The lateral cross-sectional shape of the flexible electric wire 50A of this embodiment is a perfect circle. The outer diameter of the flexible electric wire 50A is, for example, smaller than the outer diameter of the hard electric wire 40. The outer diameter of the flexible electric wire 50A is, for example, smaller than the outer diameter of the flexible electric wire 30 (see FIG. 2).

As shown in FIG. 1, for example, an intermediate portion in the longitudinal direction of the flexible electric wire 50A is provided inside the tubular member 60. For example, the intermediate portion in the longitudinal direction of the flexible electric wire 50A is housed inside the tubular member 60 together with the electric wire members 20. Both end portions in the longitudinal direction of the flexible electric wire 50A respectively extend toward the outside of the tubular member 60 from the end portions 61 and 62 in the longitudinal direction of the tubular member 60.

Configuration of Tubular Member 60

The tubular member 60 is formed in an elongated tubular shape. The tubular member 60 of this embodiment is formed in a tubular shape whose cross-sectional shape is a perfect circle. That is, the lateral cross-sectional shape of the tubular member 60 of this embodiment is a perfect circle. For example, the intermediate portions in the longitudinal directions of the electric wire members 20 and 50 are housed inside the tubular member 60. The inner diameter of the tubular member 60 is set to, for example, a size that enables the two electric wire members 20 and the two electric wire members 50 to be housed thereinside. The tubular member 60 surrounds, for example, the outer circumferences of the electric wire members 20 and 50 over the entire circumference in the circumferential direction thereof. The tubular member 60 is, for example, harder than the insulating coatings 32, 42, and 52 of the electric wire members 20 and 50 (see FIGS. 2 and 3). Examples of the tubular member 60 include a metal pipe made of a metal and a resin pipe made of a resin. Examples of the material of the metal pipe include metal materials such as aluminum-based materials and copper-based materials. Examples of the material of the resin pipe include synthetic resins such as polyolefins, polyamides, polyesters, and ABS resins. The tubular member 60 of this embodiment is a metal pipe.

The tubular member 60 is bent, for example, two-dimensionally or three-dimensionally. The tubular member 60 includes a linear portion 63A that is located at the end portion 61 and extends linearly in the vehicle front-rear direction, a bent portion 64A (bend) that is provided at one end portion of the linear portion 63A, and a linear portion 63B that extends downward from the bent portion 64A in the vehicle vertical direction. The tubular member 60 includes a bent portion 64B that is provided at one end portion of the linear portion 63B, a linear portion 63C that extends rearward from the bent portion 64B in the vehicle front-rear direction, a bent portion 64C that is provided at one end portion of the linear portion 63C, and a linear portion 63D that extends upward from the bent portion 64C in the vehicle vertical direction.

For example, in the case of the wire harness 10, the bent portions 64A, 64B, and 64C are formed in the tubular member 60 by inserting linear electric wire members 20 and 50 into a linear tubular member 60 and then bending the tubular member 60 in which the electric wire members 20 and 50 are housed. At this time, the tubular member 60 and the electric wire members 20 and 50 inserted into the tubular member 60 are simultaneously bent. Also, in the case of the wire harness 10 of this embodiment, the bending process is started on the end portion 61 side in the longitudinal direction of the tubular member 60, and this bending process is sequentially performed toward the end portion 62. That is, the bent portions 64A, 64B, and 64C are formed in this order through the tubular member 60 bending process. Note that the bent portion 64A is the closest to the end portion 61 out of the plurality of bent portions 64A, 64B, and 64C.

As shown in FIG. 2, the linear portions 63A and 63B are respectively continuous with both sides of the bent portion 64A. The bent portion 64A is bent, for example, at a right angle. For example, the bent portion 64A is bent such that the direction in which the central axis of the linear portion 63A extends is orthogonal to the direction in which the central axis of the linear portion 63B extends. The bent portion 64A includes an inner bent part 65. Portions of the electric wire members 20 and 50 located inside the bent portion 64A are bent along the bent portion 64A.

The linear portion 63A is provided between an end surface 61A at the end portion 61 in the longitudinal direction of the tubular member 60 and the bent portion 64A. For example, the connection portions 22 of the electric wire members 20 are housed inside the linear portion 63A.

Configurations of Exterior Members 66 and 67

As shown in FIG. 1, the exterior members 66 and 67 have an elongated tubular shape. The exterior members 66 and 67 are provided, for example, at both end portions in the longitudinal direction of the wire harness 10. For example, the end portions in the longitudinal direction of the electric wire members 20 are housed inside the exterior members 66. For example, only the portions of the electric wire members 20 extending from the tubular member 60 out of the portions of the electric wire members 20 and 50 extending from the tubular member 60 are housed inside the exterior members 66. The exterior members 66 surround, for example, the outer circumferences of the flexible electric wires 30 in the longitudinal direction of the electric wire members 20 over the entire circumference in the circumferential direction thereof. For example, the end portions in the longitudinal direction of the electric wire members 50 are housed inside the exterior members 67. For example, only the portions of the electric wire members 50 extending from the tubular member 60 out of the portions of the electric wire members 20 and 50 extending from the tubular member 60 are housed inside the exterior members 67. The exterior members 67 surround, for example, the outer circumferences of the electric wire members 50 over the entire circumference in the circumferential direction thereof. Examples of the exterior members 66 and 67 include corrugated tubes and waterproof covers.

In the wire harness 10, the electric wire members 20 and 50 are housed in the tubular member 60 together, and the portions of the electric wire members 20 and the electric wire members 50 that extend outward from the tubular member 60 diverge from each other to different paths. The portions of the electric wire members 20 and the portions of the electric wire members 50 that diverge from each other to different paths are housed inside the exterior members 66 and the exterior members 67, respectively.

Configurations of Fixing Members 70, 71, and 72

As shown in FIG. 2, the wire harness 10 includes fixing members 70, 71, and 72 for bundling the plurality of electric wire members 20 and the plurality of electric wire members 50. Each of the fixing members 70, 71, and 72 bundles the plurality of electric wire members 20 and 50 together, and fixes the arrangement (layout) of the plurality of electric wire members 20 and 50. Here, the arrangement of the plurality of electric wire members 20 and 50 means the relative positions (alignment positions) of the plurality of electric wire members 20 and the plurality of electric wire members 50 relative to one another on the lateral cross section including the electric wire members 20 and 50.

The fixing members 70, 71, and 72 are provided, for example, at intervals in the longitudinal direction of the tubular member 60. The fixing member 70 is provided, for example, between the connection portions 22 and the end surface 61A of the tubular member 60 in the longitudinal direction of the tubular member 60. The fixing member 71 is provided, for example, between the connection portions 22 and the bent portion 64A in the longitudinal direction of the tubular member 60.

The fixing member 72 is provided, for example, inside the linear portion 63B. The fixing member 71 and the fixing member 72 are respectively provided on both sides of the bent portion 64A in the longitudinal direction of the tubular member 60.

The fixing members 70, 71, and 72 are each formed, for example, by winding a tape member 73 around the plurality of electric wire members 20 and 50. The tape member 73 includes, for example, an adhesive layer on one surface thereof. As shown in FIG. 3, the tape member 73 is wound onto the outer circumferential surfaces of the electric wire members 20 and 50, for example, in a state in which the adhesive layer faces the electric wire members 20 and 50. The tape member 73 is wound around the electric wire members 20 and 50, for example, a plurality of times. The tape member 73 fastens, for example, the electric wire members 20 and 50 in a direction in which these electric wire members approach each other.

Note that, although not illustrated, a plurality of fixing members for bundling the electric wire members 20 and 50 are also provided at intervals in the longitudinal direction of the tubular member 60 inside the linear portions 63C and 63D and the bent portions 64B and 64C shown in FIG. 1.

Arrangement of Electric Wire Members 20 and 50

Next, the arrangement of the electric wire members 20 and 50 inside the tubular member 60 will be described.

First, the arrangement of the electric wire members 20 and 50 in the bent portion 64A will be described with reference to FIG. 4. The hard electric wires 40 in the longitudinal direction of the electric wire members 20 are routed in the bent portion 64A.

Figure 4:
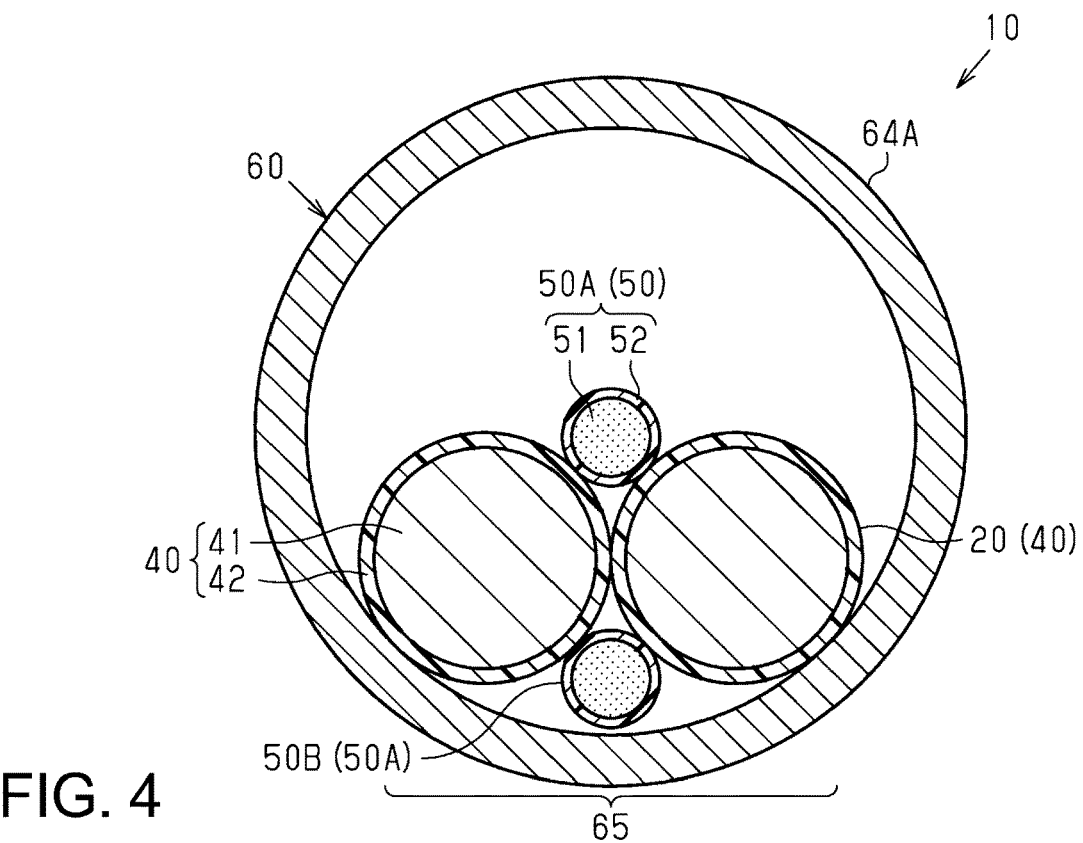
FIG. 4 is a schematic lateral cross-sectional view illustrating the wire harness of the embodiment (a cross-sectional view taken along line 4-4 in FIG. 2).

As shown in FIG. 4, in the bent portion 64A, the two hard electric wires 40 are lined up in a first direction (the left-right direction in the diagram here) that intersects the longitudinal direction of the electric wire members 20. In the bent portion 64A, the flexible electric wires 50A are lined up with the hard electric wires 40 in a second direction that intersects the first direction in which the two hard electric wires 40 are lined up. Note that the arrangement of the electric wire members 20 and 50 as described above may also be referred to as a "first arrangement" for illustrative purposes.

Subsequently, the first arrangement of the electric wire members 20 and 50 will be described in more detail.

The two hard electric wires 40 are, for example, in external contact with each other. That is, the outer circumferential surfaces of the insulating coatings 42 of the two hard electric wires 40 are in contact with each other at one point in the circumferential directions of the hard electric wires 40. The two flexible electric wires 50A are lined up, for example, in a direction that is orthogonal to the first direction (the vertical direction in the diagram here) in a state in which the two hard electric wires 40 are located therebetween. For example, the two flexible electric wires 50A are provided in gaps formed between the outer circumferences of the two hard electric wires 40. For example, the two flexible electric wires 50A are respectively provided in two gaps formed between the outer circumferences of the two hard electric wires 40. Each of the flexible electric wires 50A is, for example, in external contact with the two hard electric wires 40. For example, each of the flexible electric wires 50A is provided in a gap formed between the two hard electric wires 40 such that the outer circumferential surface of the insulating coating 52 is in contact with the outer circumferential surfaces of the two hard electric wires 40.

Next, the arrangement of the electric wire members 20 and 50 relative to the tubular member 60 will be described.

In the bent portion 64A, the hard electric wires 40 and the flexible electric wires 50A are located closer to the inner bent part 65 of the bent portion 64A than the outer bent part thereof. The two hard electric wires 40 are, for example, in internal contact with the tubular member 60. The two hard electric wires 40 are, for example, in contact with the inner circumferential surface of the bent portion 64A. For example, the outer circumferential surface of the insulating coating 42 of each of the two hard electric wires 40 is in contact with the inner surface of the inner bent part 65 at one point in the circumferential direction of the tubular member 60. The hard electric wires 40 are, for example, in external contact with each other and in internal contact with the tubular member 60.

Each of the two flexible electric wires 50A is provided in a space surrounded by the outer circumferential surfaces of the two hard electric wires 40 and the inner circumferential surface of the tubular member 60. One of the two flexible electric wires 50A that is provided closer to the inner bent part 65 is provided in a space surrounded by the inner surface of the inner bent part 65 and portions of the outer circumferential surfaces of the two hard electric wires 40 that are opposed to the inner bent part 65. In the following description, one of the two flexible electric wires 50A that is provided at a position closer to the inner bent part 65 is referred to as a "flexible electric wire 50B" for illustrative purposes. The flexible electric wire 50B is spaced apart from the outer circumferential surfaces of the hard electric wires 40 and/or the inner surface of the inner bent part 65. When the flexible electric wire 50B is in contact with, for example, the outer circumferential surfaces of the hard electric wires 40, the flexible electric wire 50B is spaced apart from the inner circumferential surface of the tubular member 60. When the flexible electric wire 50B is in contact with, for example, the inner circumferential surface of the tubular member 60, the flexible electric wire 50B is spaced apart from the outer circumferential surfaces of the hard electric wires 40. In the example shown in FIG. 4, the flexible electric wire 50B is in external contact with the two hard electric wires 40 and is spaced apart from the inner surface of the inner bent part 65. The outer diameter of the flexible electric wire 50B is set to such a size that enables the flexible electric wire 50B to be spaced apart from the outer circumferential surfaces of the hard electric wires 40 and/or the inner surface of the inner bent part 65. The following is a detailed description of the outer diameter of the flexible electric wire 50B.

Figure 5:
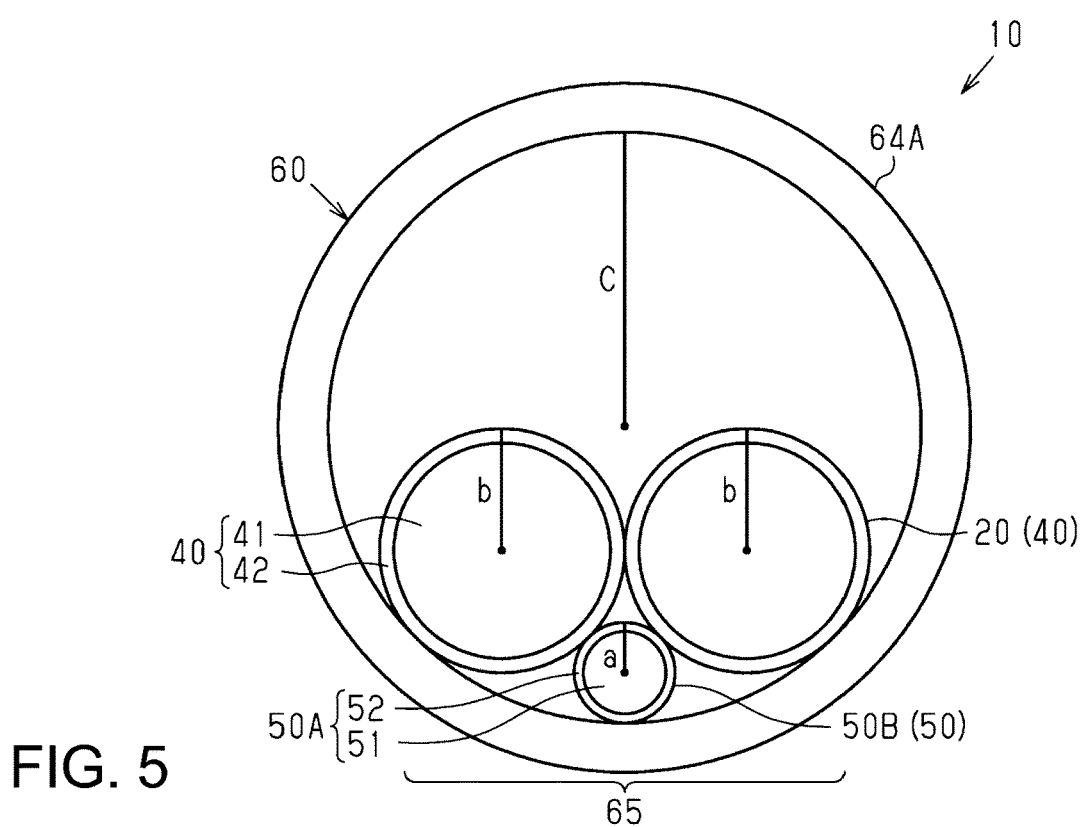
FIG. 5 is an explanatory diagram illustrating the relationship between the outer diameters of electric wire members and the inner diameter of a tubular member.

The following is a description of a case where two hard electric wires 40 and one flexible electric wire 50B are in external contact with one another, and all of the two hard electric wires 40 and the one flexible electric wire 50B are in internal contact with the tubular member 60 as shown in FIG. 5. At this time, when the radius of the outer circumference of the flexible electric wire 50B is defined as a, the two hard electric wires 40 have the same outer diameter, the radius of the outer circumference of each of the hard electric wires 40 is defined as b, and the radius of the inner circumference of the tubular member 60 is defined as c, Formula 1 below is satisfied (Descartes' Circle Theorem). Note that, in FIG. 5, only the flexible electric wire 50B of the two flexible electric wires 50A is shown and the members are not hatched to simplify the diagram.

[Mathematical Formula 2]

$$\left(\frac{1}{a}+\frac{1}{b}+\frac{1}{b}-\frac{1}{c}\right)^2 = 2\left(\frac{1}{a^2}+\frac{1}{b^2}+\frac{1}{b^2}+\frac{1}{c^2}\right) \quad \text{(Formula 1)}$$

$$\left(\frac{1}{a}+\frac{2}{b}-\frac{1}{c}\right)^2 = 2\left(\frac{1}{a^2}+\frac{2}{b^2}-\frac{1}{c^2}\right)$$

When Formula 1 above is satisfied, the flexible electric wire 50B is in contact with the outer circumferential surfaces of the two hard electric wires 40 and is in contact with the inner circumferential surface of the tubular member 60. Accordingly, when Formula 1 above is satisfied, the flexible electric wire 50B may be compressed between the outer circumferential surfaces of the two hard electric wires 40 and the inner circumferential surface of the tubular member 60. Therefore, in this embodiment, the radius of the outer circumference of the flexible electric wire 50B is set to a value smaller than the radius a that satisfies Formula 1 above. By setting the radius of the outer circumference of the flexible electric wire 50B as described above, the flexible electric wire 50B can be spaced apart from the outer circumferential surfaces of the hard electric wires 40 and/or the inner circumferential surface of the tubular member 60 as shown in FIG. 4. Accordingly, it is possible to keep the flexible electric wire 50B from being compressed between the outer circumferential surfaces of the two hard electric wires 40 and the inner circumferential surface of the tubular member 60.

In the bent portion 64A, the lateral cross-sectional shape of the hard electric wires 40, the lateral cross-sectional shape of the flexible electric wire 50B, and the lateral cross-sectional shape of the tubular member 60 may be slightly changed from a perfect circle to an elliptical shape or the like due to the bending process or the like. However, even in such a case, the lateral cross-sectional shape of the hard electric wires 40, the lateral cross-sectional shape of the flexible electric wire 50B, and the lateral cross-sectional shape of the tubular member 60 are considered an unchanged perfect circle in Formula 1 above.

Note that the arrangement of the electric wire members 20 and 50 in the bent portions 64B and 64C shown in FIG. 1 is preferably the same as the arrangement in the bent portion 64A shown in FIG. 4. However, the arrangement of the electric wire members 20 and 50 in all of the bent portions 64A, 64B, and 64C included in the tubular member 60 need not necessarily be the arrangement shown in FIG. 4. For example, it is sufficient that the arrangement of the electric wire members 20 and 50 is the arrangement shown in FIG. 4 in at least one of the bent portions 64A, 64B, and 64C.

Next, the arrangement of the electric wire members 20 and 50 at a position of the linear portion 63A shown in FIG. 2 that is close to the bent portion 64A will be described. FIG. 3 shows the lateral cross-sectional shapes of the electric wire members 20 and 50, the tubular member 60, and the fixing member 71 at the position at which the fixing member 71 is provided.

As shown in FIG. 3, the arrangement of the two hard electric wires 40 and the two flexible electric wires 50A is the first arrangement as in the case of the bent portion 64A shown in FIG. 4. In this embodiment, the two hard electric wires 40 are in external contact with each other, and each of the flexible electric wires 50A is in external contact with the two hard electric wires 40. The two hard electric wires 40 and the two flexible electric wires 50A are bundled using, for example, the tape member 73 constituting the fixing member 71. Thus, the arrangement of the two hard electric wires 40 and the two flexible electric wires 50A is kept as the first arrangement. The hard electric wires 40 and the flexible electric wires 50A bundled together using the fixing member 71 are arranged, for example, at the central portion in the radial direction of the tubular member 60. At this time, the outer circumferential surface of the fixing member 71, the outer circumferential surfaces of the hard electric wires 40, and the outer circumferential surfaces of the flexible electric wires 50A are not in contact with, for example, the inner circumferential surface of the tubular member 60.

The arrangement of the two hard electric wires 40 and the two flexible electric wires 50A is the first arrangement in the linear portion 63B shown in FIG. 2 as in the case shown in FIG. 3. The arrangement of the two hard electric wires 40 and the two flexible electric wires 50A is kept as the first arrangement by the fixing member 72. Thus, the arrangement of the electric wire members 20 and 50 is kept as the first arrangement between the fixing member 71 and the fixing member 72. Accordingly, the arrangement of the electric wire members 20 and 50 is kept as the first arrangement inside the bent portion 64A provided between the fixing member 71 and the fixing member 72.

Figure 6:
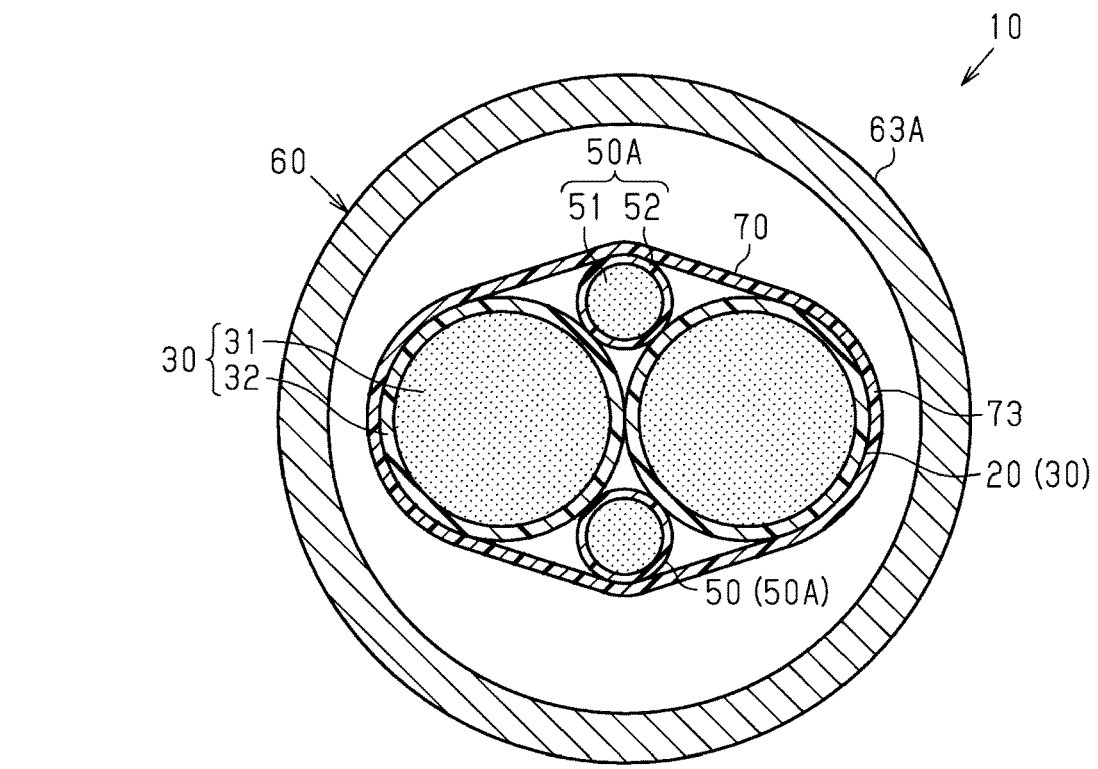
FIG. 6 is a schematic lateral cross-sectional view illustrating the wire harness of the embodiment (a cross-sectional view taken along line 6-6 in FIG. 2).

Next, the arrangement of the electric wire members 20 and 50 at the position in the longitudinal direction of the linear portion 63A at which the fixing member 70 is provided will be described. The flexible electric wires 30 in the longitudinal direction of the electric wire members 20 are routed in the portion provided with the fixing member 70. FIG. 6 shows the lateral cross-sectional shapes of the electric wire members 20 and 50, the tubular member 60, and the fixing member 70 at the position at which the fixing member 70 is provided.

As shown in FIG. 6, the arrangement of the two electric wire members 20 and the two electric wire members 50 is the first arrangement as in the case of the bent portion 64A shown in FIG. 4. In this embodiment, the two flexible electric wires 30 are in external contact with each other, and each of the flexible electric wires 50A is in external contact with the two flexible electric wires 30. The two flexible electric wires 30 and the two flexible electric wires 50A are bundled using, for example, the tape member 73 constituting the fixing member 70. Thus, the arrangement of the two flexible electric wires 30 and the two flexible electric wires 50A is kept as the first arrangement. Accordingly, the arrangement of the electric wire members 20 and 50 is kept as the first arrangement between the fixing member 70 and the fixing member 71 shown in FIG. 2. Therefore, the arrangement of the electric wire members 20 and 50 is kept as the first arrangement at the connection portions 22 provided between the fixing member 70 and the fixing member 71.

The following is a description of the functions and effects of this embodiment.

(1) The electric wire members 50 are provided in the spaces surrounded by the outer circumferential surfaces of the plurality of electric wire members 20 and the inner circumferential surface of the bent portion 64A, inside the bent portion 64A, and the electric wire members 50 are each spaced apart from the outer circumferential surfaces of the electric wire members 20 and/or the inner circumferential surface of the bent portion 64A. Accordingly, it is possible to keep the electric wire members 50 from being compressed by the outer circumferential surfaces of the electric wire members 20 and the inner circumferential surface of the tubular member 60. Thus, it is possible to suppress damage to the insulating coatings 42 of the hard electric wires 40 and the insulating coatings 52 of the electric wire members 50 in the bent portion 64A. As a result, it is possible to suppress a decrease in the insulation reliability of the electric wire members 20 and the electric wire members 50.

(2) The fixing members 71 and 72 for bundling the electric wire members 20 and 50 are provided on both sides of the bent portion 64A in the longitudinal direction of the tubular member 60. It is possible to keep the arrangement of the electric wire members 20 and 50 on both sides of the bent portion 64A as the first arrangement using these fixing members 71 and 72. Thus, it is possible to favorably keep the arrangement of the electric wire members 20 and 50 in the bent portion 64A as the first arrangement.

(3) In the first arrangement, the electric wire members 50 are provided in the gaps formed between the outer circumferences of the two electric wire members 20 that are in external contact with each other. Accordingly, it is possible to favorably bring each electric wire member 50 into contact with the outer circumferential surfaces of the two electric wire members 20. Thus, it is possible to increase the contact area between the electric wire members 20 and the electric wire members 50 compared with a configuration in which each electric wire member 50 comes into contact with only one electric wire member 20. Therefore, it is possible to, for example, favorably disperse stress applied to the electric wire members 50 due to vibrations or the like, thus making it possible to favorably suppress damage to the insulating coatings 52 of the electric wire members 50.

(4) The radii of the outer circumferences of the electric wire members 50 are set to a value smaller than the radius a that satisfies Formula 1 above. This enables the electric wire members 50 to be favorably spaced apart from the outer circumferential surfaces of the two electric wire members 20 and/or the inner circumferential surface of the bent portion 64A. Therefore, it is possible to more favorably keep the electric wire members 50 from being compressed by the outer circumferential surfaces of the electric wire members 20 and the inner circumferential surface of the tubular member 60.

(5) Using Formula 1 makes it easy to determine whether or not the electric wire member 50 will come into contact with all of the outer circumferential surfaces of the electric wire members 20 and the inner circumferential surface of the tubular member 60 based on the outer diameters of the electric wire members 20 and 50 and the inner diameter of the tubular member 60. Also, it is possible to adjust the outer diameters of the electric wire members 20 or the inner diameter of the tubular member 60 such that the radii of the outer circumferences of the electric wire members 50 are smaller than the radius a in Formula 1 above.

(6) The two flexible electric wires 50A are respectively provided in two gaps formed between the outer circumferences of the two hard electric wires 40 inside the bent portion 64A. Accordingly, it is possible to keep the flexible electric wires 50A from being compressed between the outer circumferential surfaces of the hard electric wires 40, which have high flexural rigidity, and the inner circumferential surface of the hard tubular member 60. Also, it is possible to keep the flexible electric wires 50A from being compressed by the two hard electric wires 40. As a result, it is possible to favorably suppress damage to the insulating coatings 42 of the hard electric wires 40 and the insulating coatings 52 of the flexible electric wires 50A.

Other Embodiments

The embodiment mentioned above can be implemented with various modifications as follows. The embodiment mentioned above and the following modified examples can be implemented in combination with each other as long as they are technically compatible with each other.

In the embodiment mentioned above, the hard electric wires 40 in the longitudinal direction of the electric wire members 20 are provided inside the bent portion 64A, but there is no limitation to this configuration. For example, the flexible electric wires 30 in the longitudinal direction of the electric wire members 20 may be provided inside the bent portion 64A. In this case, inside the bent portion 64A, the flexible electric wires 50B are provided in spaces surrounded by the outer circumferential surfaces of the two flexible electric wires 30 and the inner circumferential surface of the bent portion 64A.

There is no particular limitation on the number of electric wire members 50 that pass through the tubular member 60 in the embodiment mentioned above, and the number of electric wire members 50 can be changed in accordance with the specifications of the vehicle V.

Figure 7:
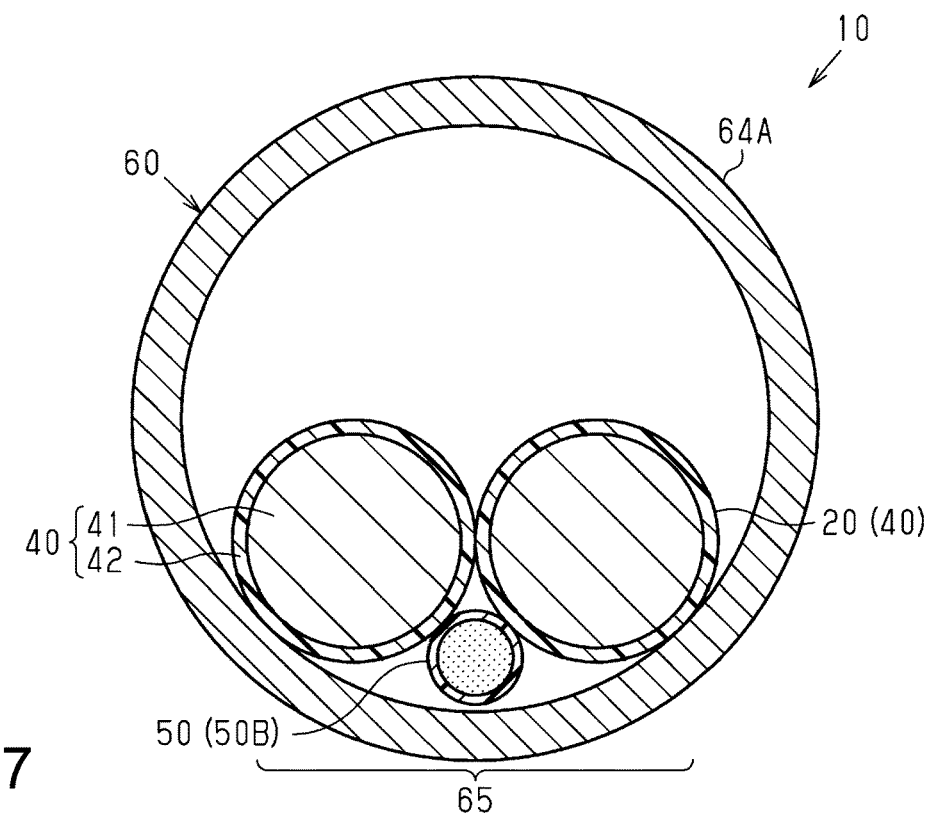
FIG. 7 is a schematic lateral cross-sectional view illustrating a wire harness of a modified example.
Figure 8:
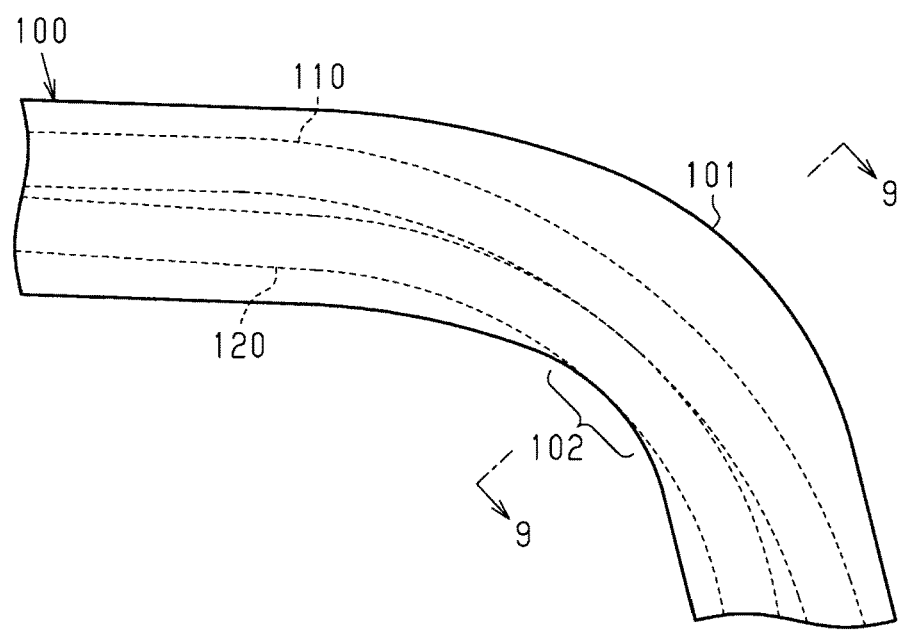
FIG. 8 is a schematic side view illustrating a conventional wire harness.
Figure 9:
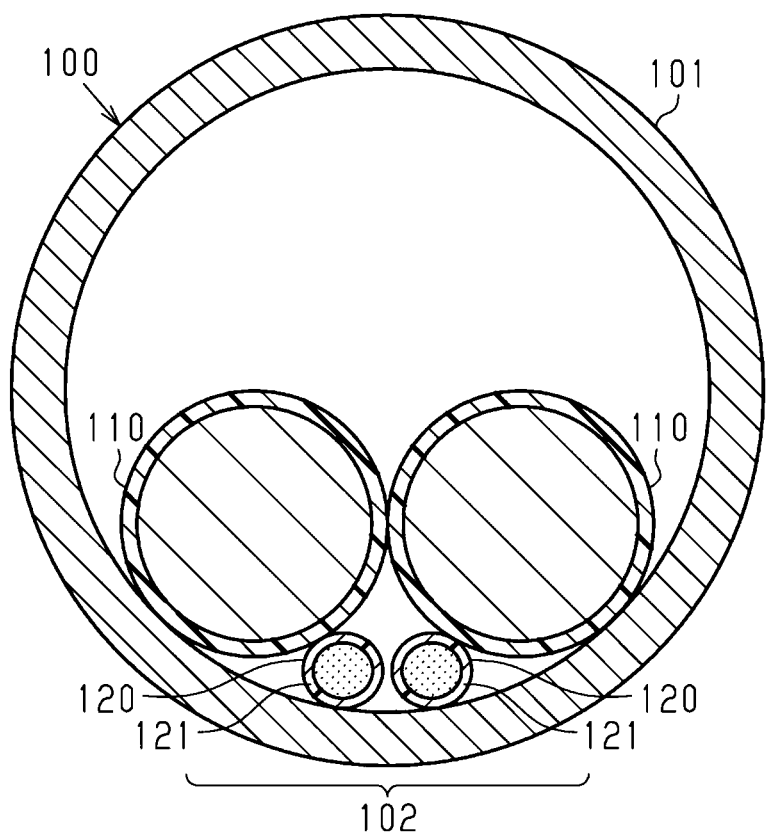
FIG. 9 is a schematic lateral cross-sectional view illustrating the conventional wire harness (a cross-sectional view taken along line 9-9 in FIG. 8).

For example, as shown in FIG. 7, a configuration may also be employed in which a single electric wire member 50 passes through the tubular member 60. In this case as well, the electric wire member 50 is provided in a space between the inner surface of the inner bent part 65 and the outer circumferential surfaces of the two electric wire members 20 that are in contact with the inner circumferential surface of the bent portion 64A, inside the bent portion 64A. Also, the number of electric wire members 50 that pass through the tubular member 60 may be set to three or more.

There is no particular limitation on the number of electric wire members 20 that pass through the tubular member 60 in the embodiment mentioned above, and the number of electric wire members 20 can be changed in accordance with the specifications of the vehicle V. The number of electric wire members 20 that pass through the tubular member 60 may also be, for example, three or more.

There is no particular limitation on the structure of the tubular member 60 of the embodiment mentioned above. For example, there is no particular limitation on the number of bent portions 64A, 64B, and 64C in the tubular member 60. Also, there is no particular limitation on the bending angles of the bent portions 64A, 64B, and 64C.

In the embodiment mentioned above, the fixing members 70, 71, and 72 are constituted by the tape member 73, but there is no limitation to this configuration. For example, metal bands or resin zip ties may also be used as the fixing members 70, 71, and 72.

The plurality of connection portions 22 in the embodiment mentioned above may also be arranged at positions that are shifted from each other in the longitudinal direction of the electric wire members 20. Moreover, the plurality of connection portions 22 may also be arranged side by side extending in the longitudinal direction of the electric wire members 20.

The tubular member 60 of the embodiment mentioned above is not limited to a metal member or resin member made of a single material. For example, the tubular member 60 may also be a complex member obtained by providing a conductive shielding layer on or inside a non-metal pipe main body.

In the embodiment mentioned above, an exterior member having, for example, a branched path may be provided between the tubular member 60 and the exterior members 66 and 67. An example of such an exterior member is a waterproof cover made of a rubber.

Although not specifically stated in the embodiment mentioned above, a configuration may also be employed in which an electromagnetic shield member is provided inside the tubular member 60. For example, the electromagnetic shield member collectively surrounds the plurality of electric wire members 20. The electromagnetic shield member is provided, for example, between the inner circumferential surface of the tubular member 60 and the outer circumferential surfaces of the electric wire members 20. Examples of the electromagnetic shield member include flexible braided wires and metal foils.

In the embodiment mentioned above, both the electric wire member 20 (constituted by the flexible electric wire 30 and the hard electric wire 40) and the electric wire member 50 (constituted by the flexible electric wire 50A) are realized as non-shielded electric wires, but there is no limitation to this configuration. For example, the electric wire member 20 may be a non-shielded electric wire, and the electric wire member 50 may be a shielded electric wire. For example, the electric wire member 20 may be a shielded electric wire, and the electric wire member 50 may be a non-shielded electric wire. For example, both of the electric wire members 20 and 50 may be shielded electric wires.

In the embodiment mentioned above, the outer diameters of the electric wire members 50 are smaller than the outer diameters of the electric wire members 20, but there is no limitation to this configuration. The outer diameters of the electric wire members 50 may be the same as the outer diameters of the electric wire members 20 or larger than the outer diameters of the electric wire members 20.

The positional relationship between the electric apparatuses M1 to M4 in the vehicle V is not limited to that of the embodiment mentioned above, and may also be changed as appropriate in accordance with the vehicle configuration.

The embodiments disclosed herein are exemplary in all respects, and should be construed as being not limitative. The scope of the present disclosure is indicated by the scope of the appended claims rather than the above description, and all changes that fall within the same essential spirit as the scope of the claims are intended to be included therein.

What is claimed is:

1. A wire harness comprising:
    a plurality of first electric wire members that each have a first flexible electric wire and a hard electric wire electrically connected to the first flexible electric wire:
    a second electric wire member that is a second flexible electric wire:
    a tube through which the plurality of first electric wire members and the second electric wire member pass: and a fixing member for bundling the plurality of first electric wire members and the second electric wire member, wherein:
    the tube includes a bend, the wire harness is configured to achieve a first arrangement,
    an arrangement of the plurality of first electric wire members and the second electric wire member inside the bend is the first arrangement in which the plurality of first electric wire members are lined up in a first direction and the second electric wire member is lined up with the plurality of first electric wire members in a second direction that intersects the first direction,
    the plurality of first electric wire members are each in contact with an inner circumferential surface of the bend inside the bend, and
    the second electric wire member is provided in a space surrounded by outer circumferential surfaces of the plurality of first electric wire members and the inner circumferential surface of the bend inside the bend, and the second electric wire member is spaced apart from the outer circumferential surfaces of the plurality of first electric wire members and/or the inner circumferential surface of the bend.

2. The wire harness according to claim 1, wherein:
    the fixing member includes a plurality of fixing members,
    the plurality of fixing members each keep the arrangement of the plurality of first electric wire members and the second electric wire member as the first arrangement, and
    the plurality of fixing members are provided at intervals in a longitudinal direction of the tube.

3. The wire harness according to claim 2,
    wherein the plurality of fixing members are provided on both sides of the bend in the longitudinal direction of the tube.

4. The wire harness according to claim 1, wherein:
    a lateral cross-sectional shape of the plurality of first electric wire members is a perfect circle,
    a lateral cross-sectional shape of the second electric wire member is a perfect circle,
    a lateral cross-sectional shape of the tube is a perfect circle, and
    in the first arrangement, two first electric wire members of the plurality of first electric wire members are in external contact with each other, and the second electric wire member is provided in a gap formed between outer circumferences of the two first electric wire members.

5. The wire harness according to claim 4,
    wherein, when a radius of an outer circumference of the second electric wire member is defined as a, a radius of an outer circumference of each of the two first electric wire members is defined as b, and a radius of an inner circumference of the tube is defined as c, a radius of an outer circumference of the second electric wire member is set to a value smaller than the radius a that satisfies Formula 1 below:

$$\left(\frac{1}{a}+\frac{2}{b}-\frac{1}{c}\right)^2 = 2\left(\frac{1}{a^2}+\frac{2}{b^2}+\frac{1}{c^2}\right). \quad \text{(Formula 1)}$$

6. The wire harness according to claim 4,
    wherein an outer diameter of the second electric wire member is smaller than outer diameters of the plurality of first electric wire members.

7. The wire harness according to claim 4, wherein:
    the second electric wire member includes two second electric wire members, and
    in the first arrangement, the two second electric wire members are respectively provided in two gaps formed between outer circumferences of the two first electric wire members.

8. The wire harness according to claim 1, wherein the hard electric wires in a longitudinal direction of the plurality of first electric wire members are provided in the bend.

* * * * *